United States Patent [19]

Gehlsen et al.

[11] Patent Number: 5,230,522

[45] Date of Patent: Jul. 27, 1993

[54] APPARATUS FOR MOVING A WHEELCHAIR OVER STEPPED OBSTACLES

[76] Inventors: Paul R. Gehlsen, 605 Center Rd., Apt. H-206, Everett, Wash. 98204; Ronald N. Hatcher, 5060 N. Stonehouse Pl., Tucson, Ariz. 85715

[21] Appl. No.: 720,987

[22] Filed: Jun. 25, 1991

[51] Int. Cl.⁵ ............................................. B62B 5/02
[52] U.S. Cl. ................................. 280/5.3; 180/8.2; 187/9 R; 280/304.1; 414/921
[58] Field of Search ............ 280/5.3, 5.24, 5.2, 280/5.32, DIG. 10, 304.1; 187/9 R; 414/921; 180/8.2

[56] References Cited

U.S. PATENT DOCUMENTS

| | | | |
|---|---|---|---|
| 3,226,128 | 12/1965 | Grier, Jr. | 280/5.2 |
| 3,411,598 | 11/1968 | Weaver | 280/5.2 |
| 3,494,440 | 2/1970 | Hanson | 180/8 |
| 3,596,982 | 8/1971 | Grams | 297/71 |
| 3,985,389 | 10/1976 | Bonfield | 297/347 |
| 4,083,599 | 4/1978 | Gaffney | 297/131 |
| 4,222,449 | 9/1980 | Feliz | 180/8 A |
| 4,564,086 | 1/1986 | Kingston | 187/12 |
| 4,614,246 | 9/1986 | Masse et al. | 180/6.5 |
| 4,618,155 | 10/1986 | Jayne | 280/5.28 |
| 4,786,107 | 11/1988 | Crockett | 297/330 |

FOREIGN PATENT DOCUMENTS

| | | | |
|---|---|---|---|
| 3018655 | 5/1980 | Fed. Rep. of Germany | 280/5.24 |
| 1069810 | 1/1984 | U.S.S.R. | 280/DIG. 10 |

*Primary Examiner*—David M. Mitchell
*Attorney, Agent, or Firm*—Pretty, Schroeder, Brueggemann & Clark

[57] ABSTRACT

A lifting apparatus is easily attached to a conventional wheelchair and allows the wheelchair to successfully negotiate stepped obstacles, such as steps and curbs. The apparatus includes two parallel base runners that are extended from beneath the wheelchair to the ground to act as a lifting platform. A lifting subsystem then moves the wheelchair vertically and horizontally to the height of the step, and a sliding subsystem then moves the wheelchair forward onto the step. Descending a step is accomplished in a reverse sequence of operations.

17 Claims, 8 Drawing Sheets

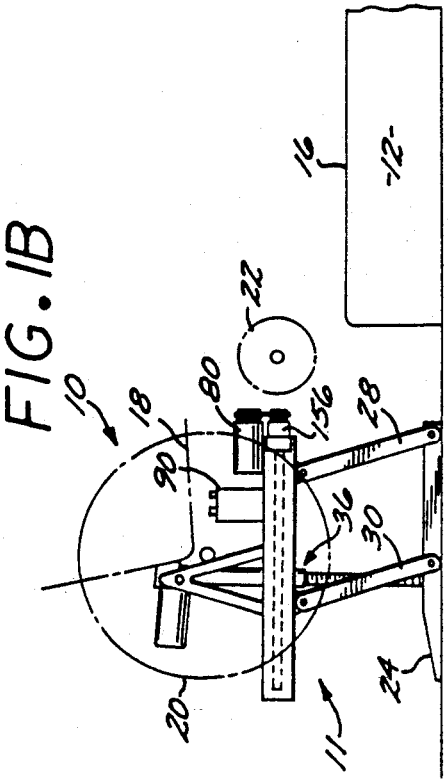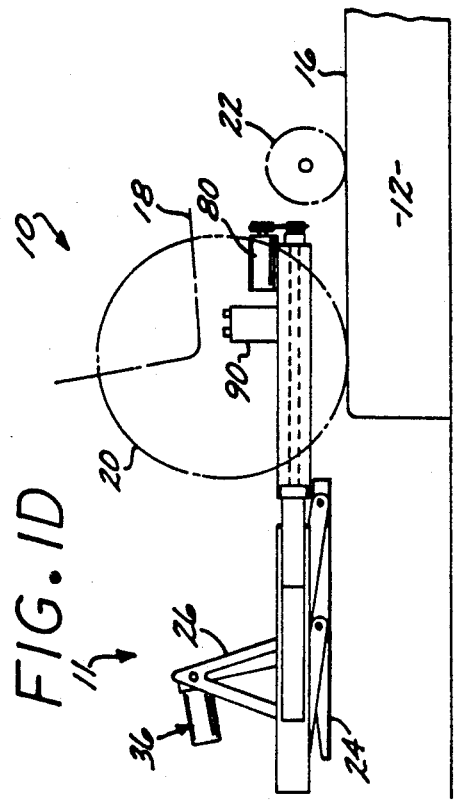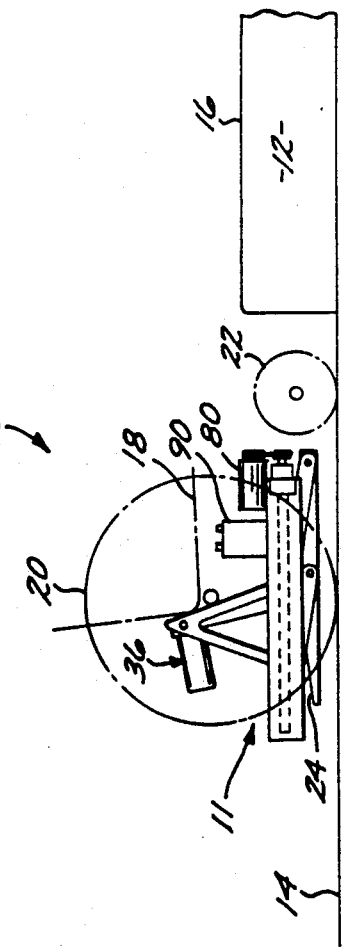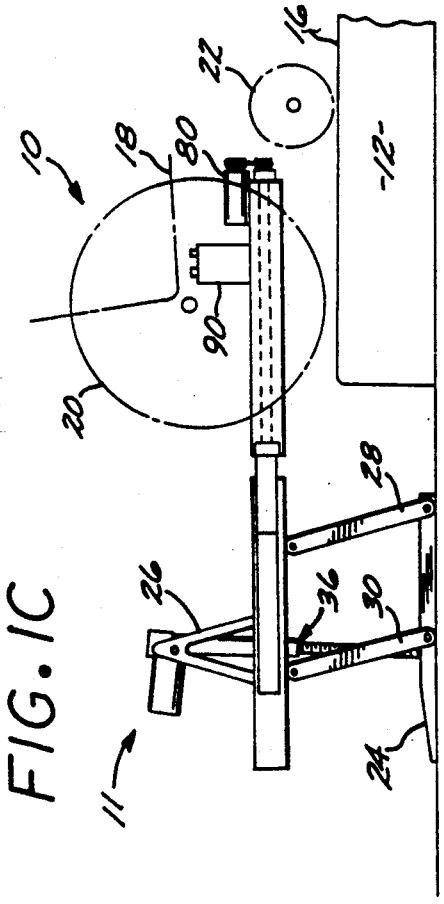

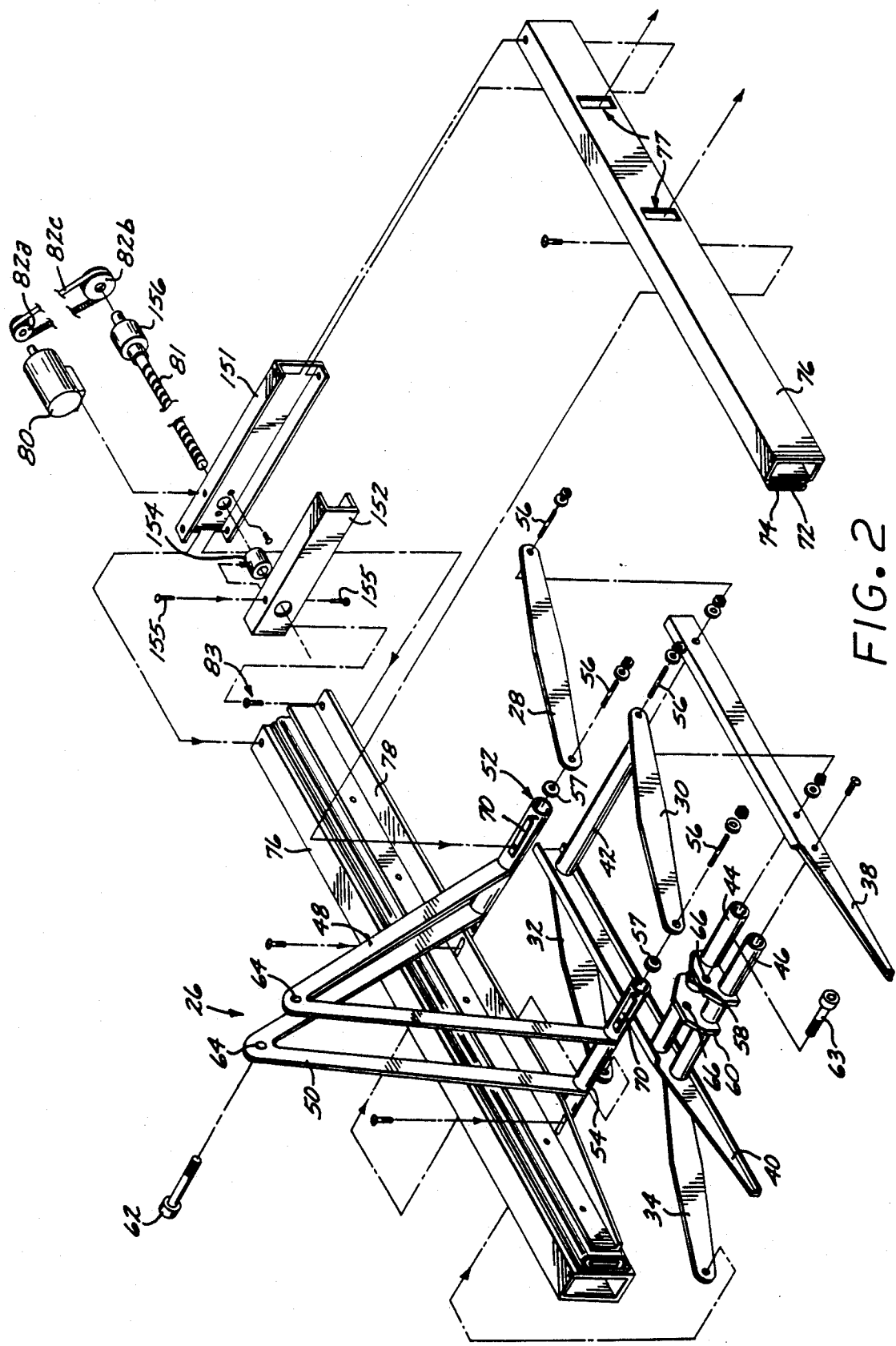

APPARATUS FOR MOVING A WHEELCHAIR OVER STEPPED OBSTACLES

BACKGROUND OF THE INVENTION

1. Field of the Invention

This invention relates generally to wheelchairs and, more particularly, to wheelchairs that are adapted to traverse stepped obstacles.

2. Description of the Related Art

Persons who are confined to wheelchairs can often be confronted with stepped obstacles, such as curbs at street intersections and steps at building entrances. Conventional wheelchairs include a seat supported by two parallel, tubular side frames each having one large rear wheel with a slightly smaller concentric hand wheel for propelling leverage and one small swiveling front wheel for steering. It can be extremely difficult for a wheelchair-bound person to traverse up and over stepped obstacles, and ultimately assistance or an alternate route must often be sought. Many attempts have been made to provide wheelchairs with the ability to negotiate stepped obstacles, but most have drawbacks that have prevented widespread acceptance.

Some step-climbing wheelchairs that can successfully negotiate stepped obstacles bear little resemblance to the conventional wheelchair and comprise expensive, complicated climbing devices. For example, such climbing devices might incorporate deployable ramps that are carried with the climbing device, or might include movable support columns that allow the device to step up and down. Such climbing devices normally are quite heavy, often weighing several hundred pounds. Because of their great weight, they are too heavy for the occupant to roll forward manually, and require propelling assistance from a drive motor. Requirement for a drive motor adds further to the expense of the device. Exemplary stair-climbing devices are described in U.S. Pat. No. 4,222,449 to Feliz and in U.S. Pat. No. 4,618,155 to Jayne.

Some step-climbing wheelchairs are essentially conventional wheelchairs modified with a step-climbing structure at more modest expense than the more complicated climbing devices described above. Such structures can be difficult to adapt to a conventional wheelchair or can be difficult to operate by a wheelchair occupant who has limited motor coordination. For example, some devices comprise ski-like slides that are added to the wheelchair frame or comprise gripping elements that are added to the large wheels. Operation of so-modified wheelchairs could require successive manual deployment and retraction of the climbing elements or could require adjusting the operation of hydraulic valves for raising and lowering the slides, tasks that are not easily performed by someone with limited motor coordination. Exemplary step-climbing wheelchairs are described in U.S. Pat. No. 3,336,128 to Grier and U.S. Pat. No. 3,985,389 to Bonfield.

From the foregoing discussion, it should be apparent that there is a need for an apparatus that allows a wheelchair to traverse stepped obstacles, that can be attached to a conventional wheelchair without extensive modifications, and that is relatively lightweight and easy to operate. The present invention satisfies this need.

SUMMARY OF THE INVENTION

The present invention provides a wheelchair that moves from an initial position in a first plane to a final position in a second, different plane by moving between the planes in an arc while being maintained in a level orientation and by moving horizontally in one of the planes to a position at one end of the arc. In this way, the wheelchair successfully negotiates stepped obstacles, such as curbs. In one aspect of the invention, the wheelchair climbs a step by first moving through an arc while staying level to reach the height of the step, and then moving forward onto the step. In another aspect of the invention, the wheelchair descends a step by moving through a reverse sequence.

The present invention is embodied in an apparatus that easily attaches to a conventional wheelchair having a seat extending between two wheeled side-frames. The apparatus is relatively lightweight and therefore does not require the wheelchair to be self-propelled, although it can be used with motorized wheelchairs as well as with conventional manual wheelchairs. The apparatus is extended to cause movement through an arc and movement through a horizontal plane. When not in use, the apparatus is compactly retracted beneath the undercarriage of the wheelchair and therefore does not decrease the wheelchair's maneuverability. The apparatus includes a lifting subsystem for moving the wheelchair through an arc while maintaining the wheelchair in a level orientation and includes a sliding subsystem for moving the wheelchair horizontally at one end of the arc.

The lifting subsystem comprises two spaced-apart, parallel horizontal runners that span between the front and back of the wheelchair when the subsystem is retracted and that act as a lifting base when the subsystem is extended. Two sets of first and second elongated links are pivotally attached at one of their ends to each horizontal runner and are pivotally attached at their other ends to the wheelchair frame, the wheelchair ends of the elongated links defining an arc as the links are rotated with respect to the base runners. An actuator exerts a linearly-directed force between the wheelchair and the base runners to move the wheelchair through the arc.

The sliding subsystem comprises first and second horizontally extending rail members that slide relative to each other and that are located on each side of the wheelchair. The first rail members are attached to the lifting subsystem and the second rail members are attached to the wheelchair side frames. The sliding subsystem also includes a power screw connected at one end to the first rail members by a first cross-member and to the second rail members by a nut attached to a second cross-member through which the screw is threaded. When the screw is rotated, relative movement between the cross-members occurs and the wheelchair slides along the horizontal path defined by the rail members.

Two switches operate the respective subsystems. A first switch is used to operate the lifting subsystem, moving the wheelchair through its arc in either a forward direction or a reverse direction. The lifting subsystem preferably incorporates means that automatically halts operation of the lifting subsystem when the limit of travel is reached. A second switch is used to operate the sliding subsystem to move the wheelchair in a forward direction or a rearward direction. The sliding subsystem also includes means to automatically halt operation when the limit of horizontal travel is reached in either direction. Thus, the apparatus can be operated easily by a wheelchair occupant who has only limited motor coordination.

In another aspect of the invention, the base runners are supplemented by a moving base element that is connected to the first pair of elongated links by a cross bar and two L-shaped links such that, as the wheelchair is moved through its arc, the moving base element is extended away from the base runners, effectively expanding the support base and providing a more stable lifting platform for the wheelchair.

The base runners also can be supplemented by a stabilizing foot mechanism in which extending feet can be deployed from the base runners to help stabilize the wheelchair when the sliding subsystem is activated and the wheelchair wheels touch the surface of the stepped obstacle. The feet prevent the base runners from sliding away from the step. The feet are not deployed when slip between the base and the ground is desired, as when the apparatus is being retracted.

Other features and advantages of the present invention should be apparent from the following description of the preferred embodiments, which illustrate, by way of example, the principles of the invention.

BRIEF DESCRIPTION OF THE DRAWINGS

FIGS. 1A, 1B, 1C, and 1D are elevational views of a wheelchair, fitted with a first embodiment of a lifting apparatus constructed in accordance with the present invention, and show the wheelchair climbing a step.

FIG. 2 is an exploded perspective view of the major components of the lifting apparatus shown in FIG. 1.

DESCRIPTION OF THE PREFERRED EMBODIMENTS

Figure 3:
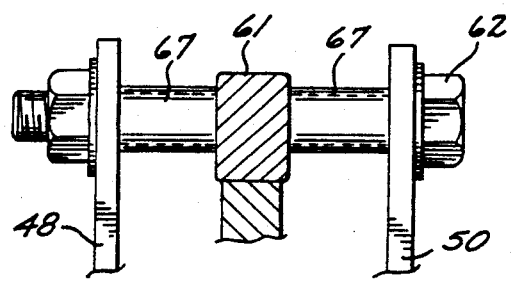
FIG. 3 is a detail plan view of the upper clevis mount for the lifting apparatus shown in FIG. 2.

FIGS. 1A, 1B, 1C, and 1D illustrate the sequence of operations for moving a wheelchair 10 modified in accordance with the present invention over a stepped obstacle, such as a curb 12, moving from a first plane 14 to a second, higher plane 16 at the top of the curb. Details of the wheelchair frame in these views have been omitted for the sake of clarity, with the relative positions of the wheelchair seat 18, large rear wheel 20, and smaller, swiveling front wheel 22 on one side of the wheelchair included for better understanding of the invention.

The wheelchair 10 includes two major subsystems, a lifting subsystem and a sliding subsystem. FIG. 1A shows the wheelchair in an initial position, with the step-climbing apparatus 11 retracted and stowed beneath the wheelchair. To negotiate the curb 12, first the lifting subsystem moves the wheelchair through an arc from the first plane surface 14 to the second plane surface 16 by extending a rigid base 24 and moves the wheelchair an equal distance in the vertical direction and in the horizontal direction. This is best illustrated by comparing FIG. 1A with FIG. 1B. After the wheelchair 10 has been fully lifted through its arc, the sliding subsystem is activated to propel the wheelchair forward relative to the lifting subsystem and move the wheelchair onto the second plane surface 16. This is best illustrated by comparing FIG. 1B with FIG. 1C. Finally, the base 24 of the lifting subsystem is retracted, as shown in FIG. 1D, and then the sliding subsystem is used to stow the apparatus beneath the wheelchair 10 into a position like that shown in FIG. 1A. Descending the curb 12 involves the reverse sequence of operations, from FIG. 1D to FIG. 1A.

Referring to FIGS. 1A through 1D and FIG. 2, the lifting subsystem includes the base 24 and actuator tower 26, four elongated connecting links 28, 30, 32, and 34, and a linear actuator 36. The four connecting links are pivotally connected to the base and to the actuator tower and enable the actuator tower to move in an arc relative to the base. The actuator tower 26 is connected to the wheelchair 10 by the sliding subsystem, as described further below, and therefore when the tower is moved through its arc the wheelchair is moved also. Power for the movement is supplied by the linear actuator, which exerts a force that pushes the actuator tower 26 and the base 24 apart and moves the wheelchair 10 through the arc defined by the four connecting links 28-34. The linear actuator 36 incorporates a slip clutch (not illustrated) that prevents vertical movement beyond the design limit of travel for the linear actuator.

The base 24 comprises a pair of horizontal runners 38 and 40 spaced apart by a front cross-tube 42 and a pair of rear cross-tubes 44 and 46. The actuator tower 26 comprises a pair of angled legs 48 and 50, formed in the shape of an inverted V, whose ends are attached to hollow cross-tubes 52 and 54. A total of eight pivot studs 56 are used to connect one end of each connecting link 28-34 to one of the horizontal runners 38, 40 and to connect the other end of each connecting link to the open end of one of the actuator tower cross-tubes. Preferably, a force-fit aluminum insert 57 is placed in the open end of each cross-tube for receiving a pivot stud 56. The connecting links 28-34 move the actuator tower 26 in equal vertical and horizontal distances as the tower moves in its arc.

The linear actuator 36 is coupled to the actuator tower 26 and to the base 24 by a clevis arrangement. Referring to FIG. 2 and FIG. 3, an upper clevis is formed by the apex of the actuator tower legs 48 and 50, while a lower clevis is formed by two spaced-apart plates 58 and 60 that straddle the base rear cross-tubes 44 and 46. The linear actuator is provided, for example, by a commercially available 12-volt dc motor turning a worm and screw capable of vertically lifting 450 pounds through a range of twelve inches. One end of the linear actuator ends in an eyebolt-shaped head 61 (FIG. 3) that allows it to be coupled to the upper clevis by a clevis bolt 62 passing through bores 64 in the apex of each actuator tower leg 48, 50 and the other end of the linear actuator similarly ends in an eyebolt-shaped head that allows it to be coupled to the lower clevis by a clevis bolt 63 passing through bores 66 in the plates 58 and 60. Two spacers 67 maintain spacing of the clevis bolts by sliding over the clevis bolts and keeping the eyebolt ends spaced apart from the tower legs 48 and 50 or plates 58 and 60. When the linear actuator 36 is activated, the eyebolt heads of the actuator are moved apart and the clevis bolts 62 and 63 are moved away from each other, moving the actuator tower 26 in an arc while it is maintained level relative to the base 24.

For the apparatus of FIG. 1 with the linear actuator 36, the actuator tower legs 48 and 50 are spaced apart approximately three and one-half inches and are welded to the tubular cross-tubes 52 and 54. A mounting bracket perch 70 is attached to the cross-tubes outboard of the location where each actuator leg meets one of the cross-tubes. Each perch is a block of steel approximately two inches in length and one-half inch square on the sides, with a 45° bevel for proper positioning on the tubular cross-tubes. The cross-tubes preferably have a length of approximately twelve and one-half inches, and preferably are spaced apart from each other by twelve inches. Each of the actuator legs 48 and 50 is eighteen inches long. Other dimensions will be appropriate for these structures, depending on the wheelchair being used and on the particular applications and components selected. The base, linear actuator, tower, and linkage have been constructed with a total weight of only seventeen pounds.

Figure 4:
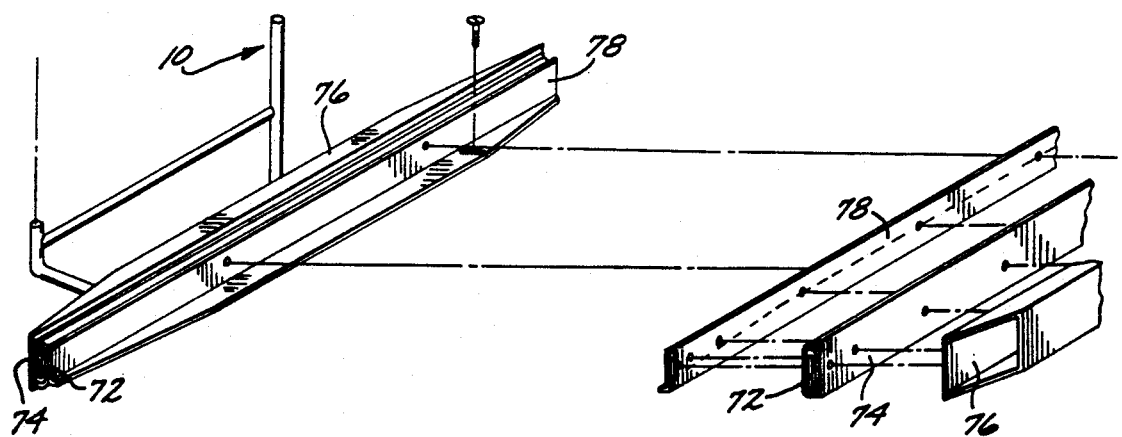
FIG. 4 is a detail view of the sliding subsystem shown in FIG. 2.

As noted, the lifting subsystem is coupled to the wheelchair 10 through the sliding subsystem. Referring to FIGS. 2 and 4, the sliding subsystem comprises an inner 72 and outer 74 sliding rail member mounted to each side frame of the wheelchair by a mounting frame 76 at mounting points 77. The sliding rail members can comprise, for example, commercially available drawer glides that provide a horizontal travel of approximately thirty inches in length. A mounting bracket 78 is attached to each inner rail 72 and is attached to the four perches 70 provided on the actuator tower cross members 52 and 54 and is also attached to a carriage motor for the sliding subsystem, as described further below. Thus, the mounting frame 76 attaches the sliding subsystem rails 72, 74 to the wheelchair frame 10, while the mounting bracket 78 attaches the lifting subsystem to the sliding subsystem and thereby to the wheelchair.

Figure 5:
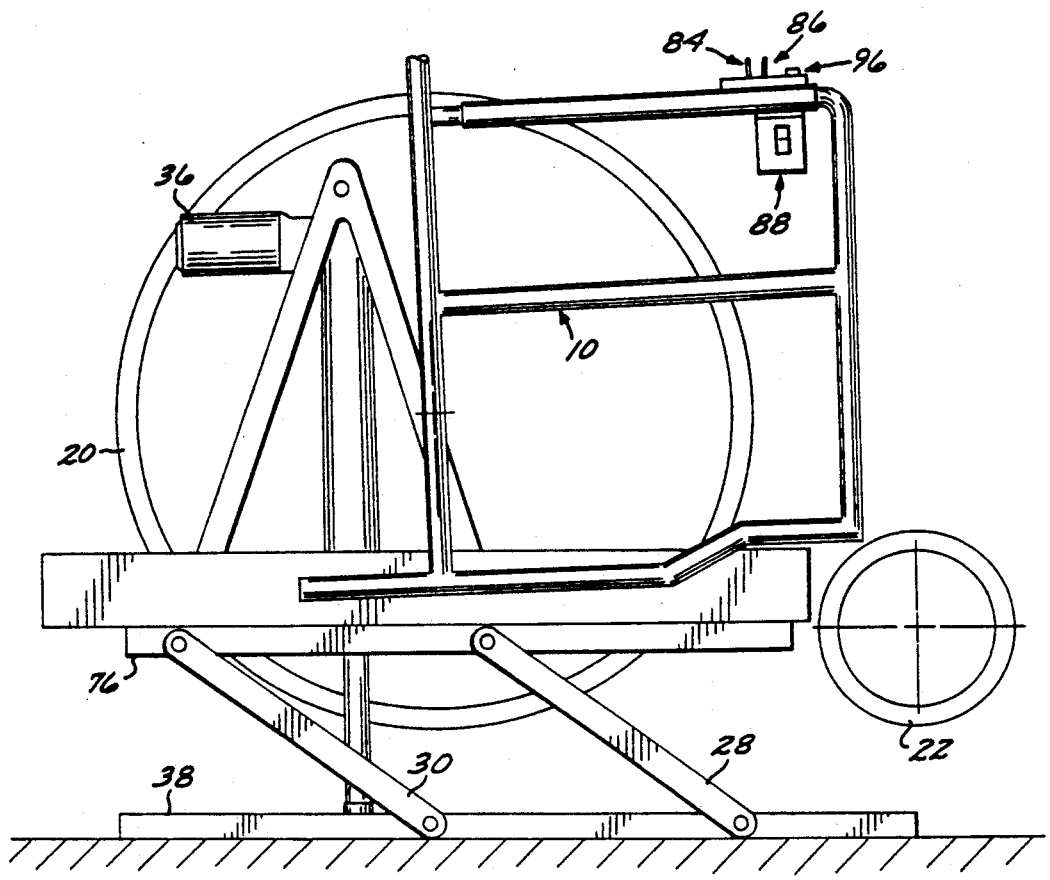
FIG. 5 is a side view illustrating the lifting action of the lifting subsystem shown in FIG. 2.

FIG. 5 is a side view of the lifting apparatus showing the wheelchair 10 mid-way through its vertical lift through an arc. Two of the connecting links 28 and 30 support the mounting bracket 78 above the horizontal runner 38. As noted, when the linear actuator 36 is activated, the clevis bolts 62 and 63 are moved away from each other and the wheelchair moves in an arc (FIGS. 1A–1D, FIG. 2). Once the wheelchair has completed its arc, the sliding subsystem moves the wheelchair forward approximately thirty inches.

As shown best in FIG. 2, the sliding subsystem moves the wheelchair forward by operation of a carriage motor 80 turning a power screw 81 through a pulley 82a, 82b and gear belt 82c arrangement. The motor is attached to a motor mount cross-member 151, which is attached to the mounting frame rails 76. The power screw is coupled to a power slide cross-member 152 by an Acme-threaded bronze nut 154. The cross-member extends between the mounting brackets 78. When the motor turns, the power screw 81 is rotated and the Acme-threaded nut 154 is threaded along the length of the power screw, moving the power slide cross-member toward or away from the motor mount cross-member 151. Vertically oriented pins 155 hold the Acme-threaded nut in the cross-member 152 such that the nut can rotate about the pins in a yawing motion. This allows the cross-member to flex about a vertical axis. The cross-member 152 is bolted to the mounting brackets 78 with a single bolt 83 at each end. This allows the cross-member to flex about a horizontal axis.

The vertical flexing of the cross-member 152 and the horizontal flexing of the cross-member combine to accommodate the slight changes in pitch of the wheelchair as it moves forward during activation of the sliding subsystem and prevent the power screw 81 from binding during activation. The power screw includes a thrust bearing assembly 156 that couples the power screw to the pulley 82b. The thrust bearing assembly is attached to the motor mount cross-member 151. The sliding subsystem can move the wheelchair linearly at a rate of approximately three inches/second, and can move the wheelchair from fully extended to fully retracted along the sliding rails in approximately ten seconds.

Figure 6:
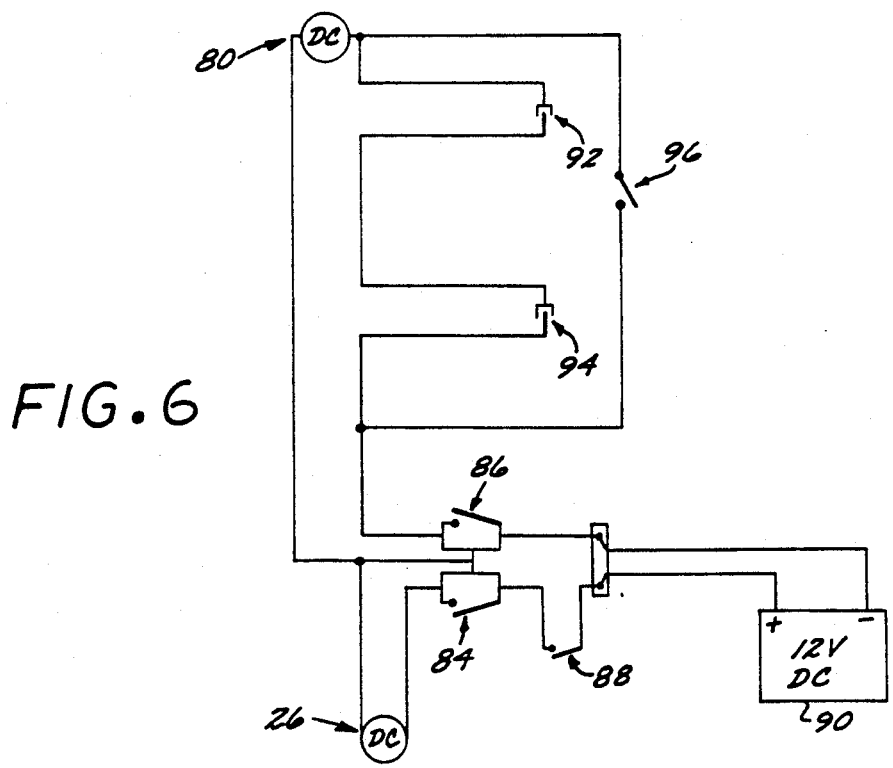
FIG. 6 is a wiring diagram of the lifting apparatus shown in FIG. 1.

FIG. 6 is a schematic diagram of the electrical components of the lifting apparatus 11. The system is activated by a pair of double-pole, double-throw switches 84 and 86 that are attached to the wheelchair frame (FIG. 5). A master switch 88 connects and disconnects the apparatus from a 12-volt dc power supply, such as a battery 90, while the double-pole, double-throw switches 84 and 86 operate the lifting subsystem and the sliding subsystem, respectively.

The sliding subsystem switch 86 acts as a selector switch to select either "EXTEND" or "RETRACT" for the subsystem in relation to the wheelchair. The sliding subsystem is powered by the carriage motor 80. A forward limit switch 92 automatically stops operation of the sliding subsystem when the forward limit of travel has been reached, and a rear limit switch 94 similarly halts operation of the sliding subsystem when the rear travel limit has been reached. The lifting subsystem switch 84 selects between "UP" and "DOWN" for the subsystem in relation to the ground. The linear actuator 36 incorporates a slip clutch that acts as a limit switch to prevent over-extension.

After the sliding subsystem has reached the end of its travel in one direction ("EXTEND" or "RETRACT") and has activated a limit switch, the opposite direction of travel can be implemented by first moving the selector switch 86 to the opposite direction ("RETRACT" or "EXTEND") and then by activating a momentary-on, override switch 96, which is electrically connected in parallel with the limit switches and remains closed only for as long as the override switch is held "on." The override switch activates the subsystem even though a limit switch has been activated. The selector switch 86 will reverse the motor and cause travel in the opposite direction, and the sliding subsystem will be stopped automatically when the opposite limit switch is activated. The override switch 96 cannot be used to over-extend the sliding subsystem because the sliding rails 72 and 74 incorporate physical limits of travel beyond which the subsystem cannot move.

Figure 7:
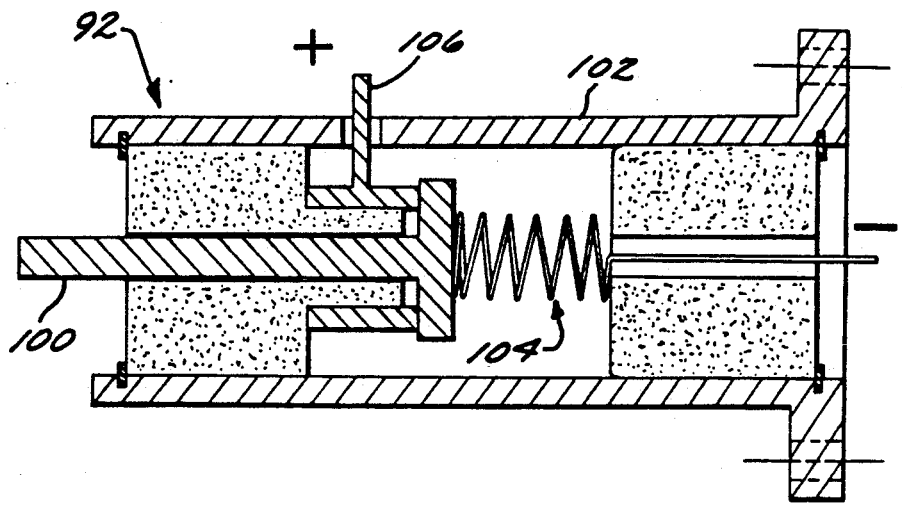
FIG. 7 is a detailed elevational cut-away view of the limit switch design for the lifting apparatus shown in FIG. 1.

FIG. 7 shows a detail of the limit switch 92 and 94 design. A plunger 100 moves within a housing 102 and presses against a return spring 104. When the return spring is fully extended as shown, the plunger makes contact with a circular post 106, which is electrically coupled to the battery 90 (FIG. 6) such that it has the opposite polarity from that of the spring. This completes the electrical circuit to the motor 80. When the limit of travel is reached for the subsystem, the plunger is moved away from the post and compresses the spring, breaking electrical contact and halting movement.

Figure 8:
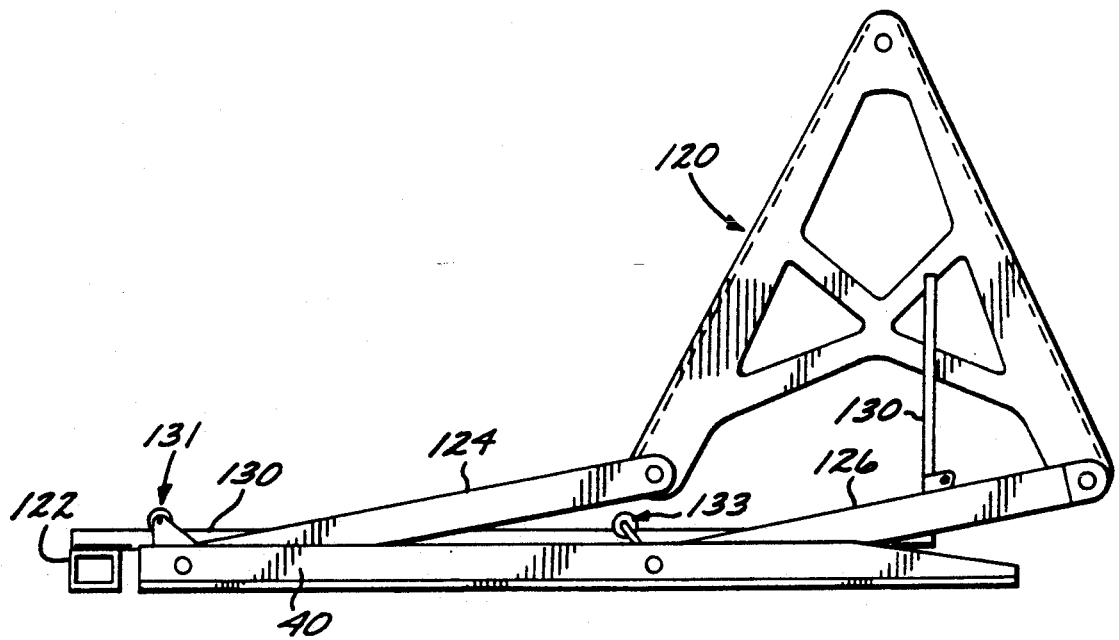
FIG. 8 is an elevational view of the lifting subsystem of a second embodiment of a lifting apparatus constructed in accordance with the present invention.

Referring to FIG. 8, an elevational view shows another embodiment of one of the actuator towers. The illustrated actuator tower 120 is stamped from ⅛th-inch thick 7075 aluminum, rather than fashioned from the 1018 steel of the prior embodiment. The stamped construction reduces cost, and the aluminum reduces weight.

FIG. 8 also shows a second embodiment of the base and connecting links, incorporating an expanding feature. The horizontal base runners 38 and 40 (only the left one of which can be seen in FIG. 8) are supplemented by a forward base member 122 that slides forward as a pair of flanged connecting links 128 pivotally connected to each base runner are pivoted forward by the actuator tower 120. Only the left pair 126 and 128 of connecting links are visible in FIG. 8.

Figure 9:
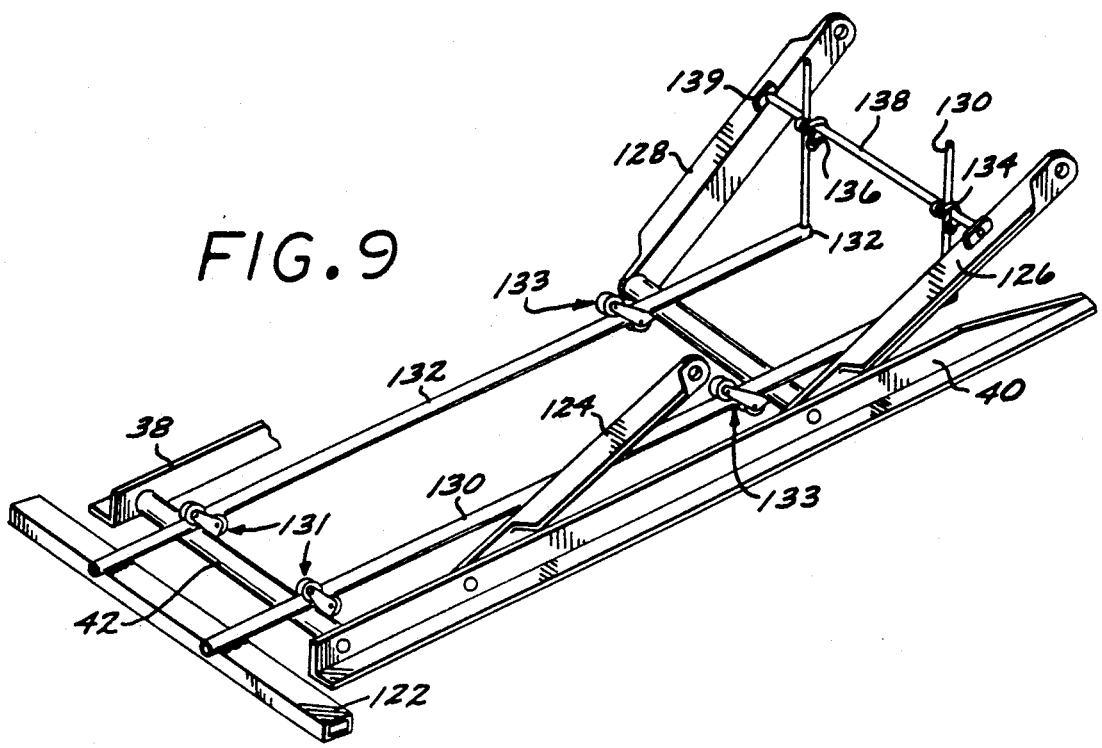
FIG. 9 is a perspective view of the expanding base of the lifting subsystem shown in FIG. 8.

Referring to FIG. 9, the expanding base embodiment is shown in perspective view, with part of the frame and the actuator tower 120 omitted for clarity. The expanding base element 122 is coupled to the left rear connecting link 126 and to a right rear connecting link 128 by two L-shaped bars 130 and 132, respectively. The longer leg of each bar extends horizontally parallel to the base runners 38 and 40, and is supported by forward 131 and rearward 133 lower roller assemblies. The shorter, vertical leg of each L-shaped bar is coupled to its respective connecting link by upper roller assemblies 134 and 136 suspended from a cross-tube 138 that moves vertically up and down the short vertical legs as the connecting links 126 and 128 pivot. When the connecting links 126 and 128 are pivoted forward, the L-shaped bars 130 and 132 are also moved forward, carrying with them the forward base member 122.

Figure 10A:
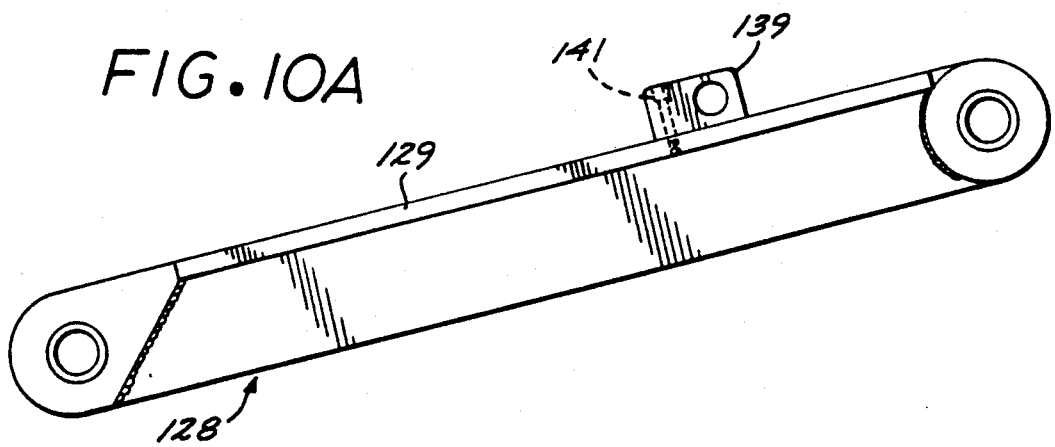
FIG. 10A and FIG. 10B are elevational and plan views, respectively, of connecting links for the lifting subsystem shown in FIG. 8.
Figure 10B:
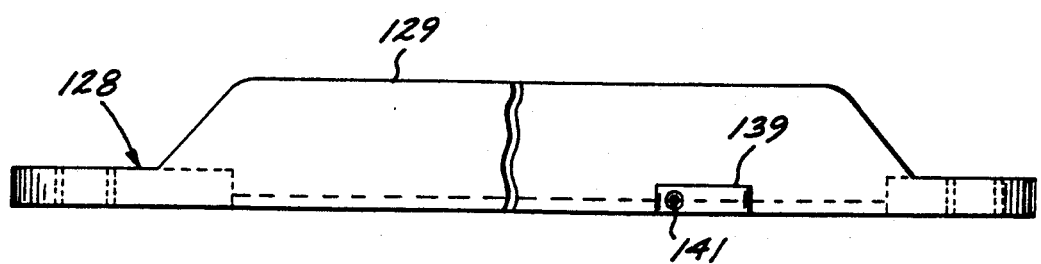

FIG. 10A and FIG. 10B are side and plan views, respectively, of one connecting link 128 showing a tab 139 attached to the link for receiving the cross-tube 138. The link is provided with a right-angle flange 129, and is preferably constructed of 6061 aluminum alloy. The tab 139 is attached to the connecting link by a bolt 141. The flanged connecting links 126 and 128 can be used in place of the flat connecting links 28, 30, 32, and 34 illustrated in FIG. 2 if desired. The flanged links 126 and 128 are somewhat stronger than the flat links illustrated in FIG. 2. If the expanding base shown in FIGS. 8 and 9 is not used along with the flanged links, then the tab 139 is unnecessary and can be omitted.

Figure 11:
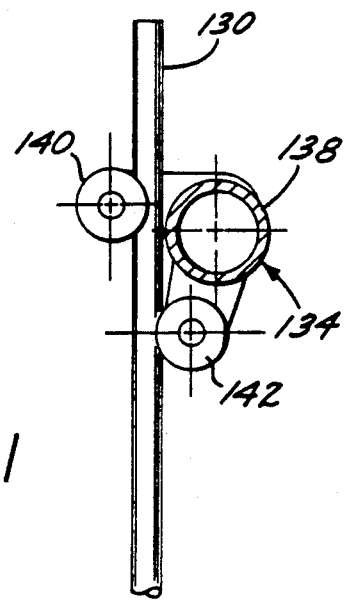
FIG. 11 is a detail elevational view of the upper roller assembly for the lifting subsystem shown in FIG. 8.
Figure 12:
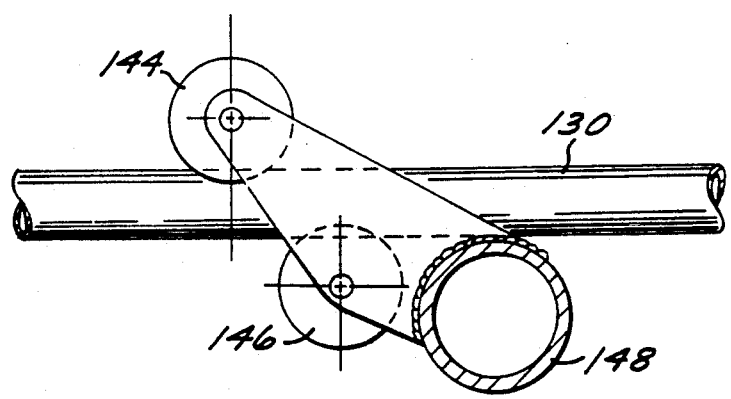
FIG. 12 is a detail elevational view of the lower roller assembly for the lifting subsystem shown in FIG. 8.
Figure 13:
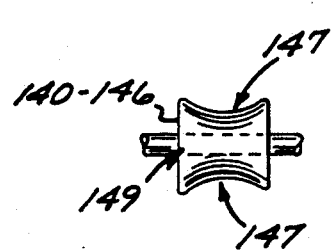
FIG. 13 is a plan view of a roller wheel used in the roller assemblies shown in FIGS. 11 and 12.

One of the upper roller assemblies is shown in greater detail in FIG. 11, which shows a roller assembly 134 holding the cross-tube 138 behind the vertical leg of an L-shaped bar 130, the movement of the roller assembly being guided by two guide wheels 140 and 142 straddling opposite sides of the vertical leg. One of the lower roller assemblies is illustrated in greater detail in FIG. 12, which shows a rearward lower roller assembly 133 being guided by two guide wheels 144 and 146 connected to each base runner by a cross tube 148. The longer leg of the L-shaped bar 130 slides between the two wheels as the links 126 and 128 rotate. FIG. 13 shows that each of the guide wheels 140, 142, 144, and 146 have an inwardly curved rolling circumference 147 and an axial shaft 149 for rotation. This allows the L-shaped bars 130 and 132 to slide more smoothly while being supported. The forward lower roller assembly 131 has a construction similar to that of the rearward lower roller assembly 133, but is attached to the forward cross-member 42 that extends between the base runners 38 and 40. The roller assembly 131 includes guide wheels similar to those illustrated in FIG. 13, and is attached to the cross member 42 similarly to the attachment of the upper roller assembly 134 to the cross-tube 138.

Figure 14:
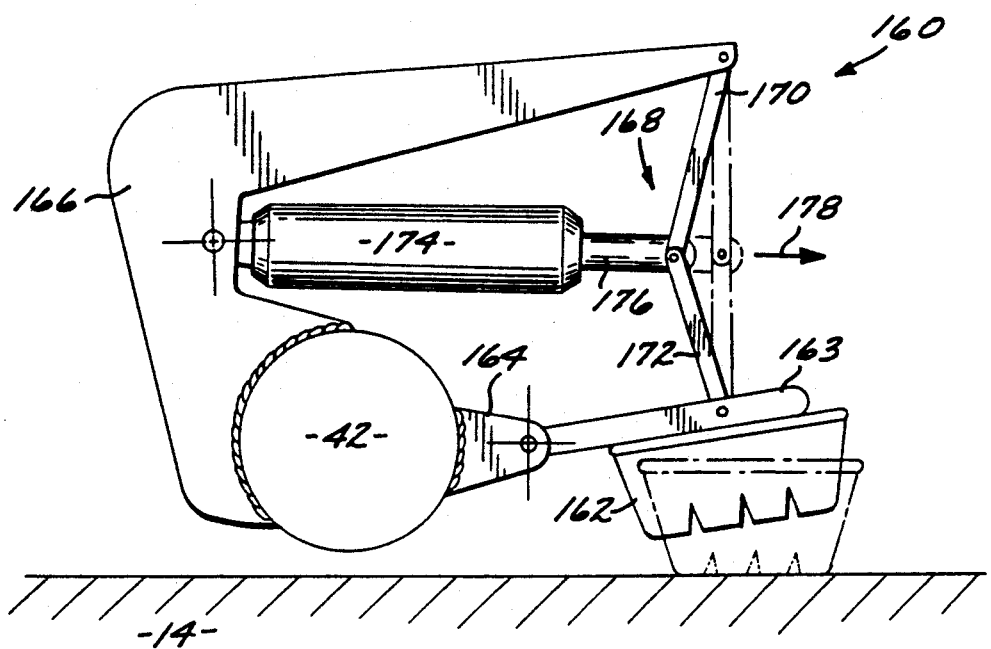
FIG. 14 is a side view of a stabilizing foot mechanism in accordance with the present invention.

Under some circumstances, it might be desirable to provide extra control of slippage during horizontal translation of the wheelchair. FIG. 14 is a side view of a stabilizing mechanism in which a rubber foot 162 is placed in contact with the ground to prevent slippage. Slippage might occur when the wheelchair attempts to climb a stepped obstacle 12 from a smooth ground surface 14. When the wheelchair is propelled horizontally onto the stepped obstacle and the wheels of the wheelchair touch the step, the base runners might slide backwards on the smooth ground. This can prevent the wheelchair from completely climbing onto the step. When the stabilizing mechanism is activated, the rubber foot 162 is pressed onto the floor 14 and prevents horizontal motion of the base runners 38 and 40 relative to the ground.

The rubber foot 162 is attached to a support arm 163 that is pivotally suspended from a first mounting bracket 164, which is attached to the forward cross-member 42. A second mounting bracket 166 is also attached to the cross-member 42 and is coupled to the rubber foot 162 and support arm 163 via a self-locking linkage 168 that includes pivotally connected arms 170 and 172. A solenoid 174 is also attached to the second mounting bracket and includes a solenoid plunger 176 that is coupled to the linkage 168. When the solenoid plunger 176 is extended forward by the solenoid in the direction of the arrow 178, the linkage arms 170 and 172 pivot and the rubber foot 162 pivots with respect to the cross-member 42 such that it makes contact with the smooth ground surface 14 and locks into place. The composition of the rubber foot is such that slippage between the foot and the ground is resisted.

The solenoid 174 preferably is actuated by a separate switch (not illustrated) so that it can be separately controlled from the sliding subsystem. Separate control is preferred because there are occasions when it is desirable to have the base members 38 and 40 slip relative to the ground 14. For example, when the apparatus is being retracted beneath the wheelchair, such as in the operation steps illustrated between FIG. 1C and FIG. 1D, the base members should slide freely or the wheelchair might be pulled back near the edge of the curb. Therefore, the rubber foot 162 would not be deployed. When the wheelchair is being horizontally translated by the apparatus, however, such as in the operation steps illustrated between FIG. 1B and FIG. 1C, the base members should be fixed relative to the ground and the rubber foot 162 would be deployed.

In the retracted position shown by solid lines, the rubber foot 162 is raised and the self-locking linkage 168 is placed in its position shown in solid lines. When the solenoid 174 is activated and the solenoid plunger 176 is moved forward in the direction of the arrow 178, the linkage is moved to its position shown in dotted lines, where it is locked into the position, and the foot is extended into engagement with the ground 12. The linkage 168 is locked by positioning the arms 170 and 172 such that upward force on the foot 162 will not cause the arms to pivot and retract the foot. When the solenoid plunger is retracted, the linkage is unlocked and the foot 162 is retracted.

Figure 15:
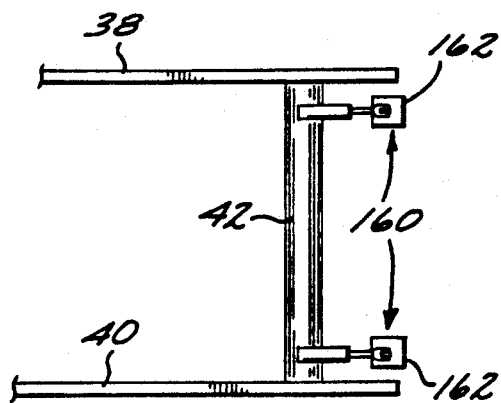
FIG. 15 is a plan view of the stabilizing foot mechanism illustrated in FIG. 15.

FIG. 15 shows that one stabilizing foot assembly 160 is provided adjacent each base runner 38 and 40. This provides a more stable lifting platform for the wheelchair and provides equal resistance to slippage for both base runners 38 and 40, thereby preventing a yawing motion of the wheelchair due to differential slippage. Each mechanism is attached to the cross-member 42.

Various details of the illustrated embodiments can be changed to suit particular applications without departing from the teachings of the invention. For example, the travel or stroke of the linear actuator determines the spacing between the cross-tubes 52 and 54 and determines the length of the connecting links 28-32. If it is desired to lift the wheelchair 18 inches, for example, a linear actuator with a stroke length of at least 18 inches would be needed. Also, the length of the connecting links and the tube spacing would need to be roughly 18 inches within approximately 10%.

The present invention provides an apparatus that can be easily attached to a conventional wheelchair and allows the wheelchair to successfully negotiate stepped obstacles. The apparatus can be attached directly to the frame of a conventional wheelchair. The lifting subsystem is actually translated fore and aft relative to the wheelchair. As a result, if the sliding subsystem is activated after the lifting subsystem has lifted the wheelchair, then the wheelchair will be propelled forward onto a step. Because the motors that power the subsystems can be reversed, the subsystems can be retracted under the wheelchair very easily with no special effort by the operator.

To negotiate a stepped obstacle, such as a curb, the wheelchair is locked in place between two and four inches from the curb. The lifting motion is then initiated, and the wheelchair is first moved through an arc while being maintained level. When the arc travel is completed, the sliding subsystem moves the wheelchair horizontally onto the curb. The lifting subsystem is then retracted underneath the wheelchair. To descend a curb, the wheelchair is backed up to the edge of a curb and the sliding subsystem is actuated to extend the lifting subsystem from beneath the wheelchair. The lifting subsystem is then actuated to place the base on the lower plane and the sliding subsystem is actuated to move the wheelchair off the curb or step. The lifting subsystem is then actuated to move the wheelchair through an arc while being maintained level, until it reaches the bottom of the curb. A wheelchair lifting apparatus in accordance with the invention has been constructed having a weight of less than 45 pounds, but lighter materials should be able to reduce that weight to 30 pounds or less. To avoid backward tipping of the wheelchair when the apparatus is extended, the operator should weigh at least 85 pounds. The operator should not weigh more than 250 pounds.

The apparatus also can be used to lift the wheelchair vertically with no horizontal translation. This allows a wheelchair occupant to reach high objects that might otherwise be inaccessible. Using only the lifting subsystem, the apparatus is capable of lifting the wheelchair up to the travel of the linear actuator, which in the illustrated embodiment is a height of approximately 12 inches. Other vertical heights can be reached by using other linear actuators and geometries.

The present invention has been described above in terms of several presently preferred embodiments so that an understanding of the present invention can be conveyed. There are, however, many configurations for wheelchairs not specifically described herein, but with which the present invention is applicable. The present invention should therefore not be seen as limited to the particular embodiments described herein, but rather, it should be understood that the present invention has wide applicability with respect to wheelchairs of a wide variety of sizes and functions. Such alternate configurations can be achieved by those skilled in the art in view of the descriptions herein.

We claim:

1. An apparatus for use with a wheelchair having two side frames with two wheels, the apparatus comprising:
   lifting means for moving the wheelchair through an arc from a first plane to a second, different plane while maintaining the wheelchair in a level orientation; and
   sliding means for moving the wheelchair horizontally at one end of the arc.

2. An apparatus as defined in claim 1, wherein the lifting means moves the wheelchair through an arc having equal vertical and horizontal components.

3. An apparatus for use with a wheel chair having two side frames with two wheels, the apparatus comprising:
   lifting means for moving the wheelchair through an arc from a first plane to a second, different plane while maintaining the wheelchair in a level orientation; and
   sliding means for moving the wheelchair horizontally at one end of the arc;
   wherein the lifting means comprises:
      two spaced-apart, parallel horizontal runners,
      a first pair of elongated links, each link pivotably attached at one end to a first location of one horizontal runner and pivotably attached at its other end to the wheelchair,
      a second pair of elongated links, each link pivotably attached at one end to a second location of one horizontal runner and pivotably attached at its other end to the wheelchair, and
      actuator means for exerting a linearly directed force between the wheelchair and the horizontal runners to pivot the elongated links.

4. An apparatus as defined in claim 3, wherein the lifting means further comprises a support frame, having four attachment points, attached to each one of the wheelchair side frames, the four attachment points of receiving one end of each of the first and second pair of elongated links.

5. An apparatus as defined in claim 4, wherein the actuator means comprises a linear actuator that is connected at one end to the support frame and is connected at the other end to the horizontal runners.

6. An apparatus as defined in claim 4, wherein the lifting means further includes a base cross-member coupled to at least two of the elongated links by a pair of L-shaped bars such that the base cross-member is moved horizontally in the same plane as the horizontal runners either forward or rearward of the horizontal runners when the elongated links are pivoted.

7. An apparatus as defined in claim 6, wherein the lifting means further includes a cross bar extending between two of the parallel elongated links and supporting two pair of upper rollers that straddler the vertical legs of the L-shaped bars.

8. An apparatus as defined in claim 6, wherein the lifting means further includes a cross bar extending between the two horizontal runners and supporting two pairs of lower rollers that straddle the horizontal legs of the L-shaped bars.

9. An apparatus for use with a wheelchair having two side frames with two wheels, the apparatus comprising:
   lifting means for moving the wheelchair through an arc from a first plane to a second, different plane while maintaining the wheelchair in a level orientation; and
   sliding means for moving the wheelchair horizontally at one end of the arc;
   wherein the sliding means comprises
      a pair of first and second rail members that slide horizontally relative to each other, the first rail members being attached to the lifting means and the second rail members being attached to the wheelchair side frames, and
      power screw means for removing the wheelchair along a horizontal path defined by the rail members, wherein the power screw means is coupled to the first rail members and to the second rail members and can abuse relative movement of the first and second rail members.

10. An apparatus as defined in claim 9, wherein the sliding means further comprises:
   a power cross-member extending laterally between the first rail members;
   a mount cross-member extending laterally between the second rail members;
   wherein the power screw means comprises a powered screw actuator, wherein one end of the actuator is attached to the power cross-member and the other end of the actuator is attached to the mount cross-member.

11. An apparatus for use with a wheelchair having two side frames with two wheels, the apparatus comprising:
   lifting means for moving the wheelchair through an arc from a first plane to a second, different plane while maintaining the wheelchair in a level orientation; and
   sliding means for moving the wheelchair horizontally at one end of the arc;
   wherein the lifting means comprises
      two spaced-apart, parallel horizontal runners suspended from the underside of the wheelchair such that they can be extended downwardly to make contact with the ground,
      a pair of first and second elongated links pivotably attached at one end to first and second locations, respectively, of each horizontal runner and pivotably attached at their other end to the wheelchair, and
      actuator means for exerting a linearly directed force between the wheelchair and the horizontal runners to move the wheelchair and horizontal runners apart and pivot the elongated links, and for moving the wheelchair through an arc defined by the elongated links and having equal vertical and horizontal components.

12. An apparatus as defined in claim 11, wherein the lifting means further includes a base cross-member coupled to at least two of the elongated links by a pair of L-shaped bars such that the base cross-member is moved away from the horizontal runners when the elongated links are pivoted.

13. An apparatus as defined in claim 12, wherein the lifting means further includes a cross bar extending between two of the parallel elongated links and supporting two pairs of upper rollers that straddle the vertical legs of the L-shaped bars.

14. An apparatus as defined in claim 13, wherein the lifting means further includes a cross bar extending between the two horizontal runners and supporting two pairs of lower rollers that straddle the horizontal legs of the L-shaped bars.

15. An apparatus as defined in claim 11, wherein the sliding means comprises:
   a pair of first and second rail members that slide horizontally relative to each other, the first rail members being attached to the lifting means and the second rail members being attached to the wheelchair side frames; and
   power screw means for moving the wheelchair along a horizontal path defined by the rail members, wherein the power screw means is coupled to the first rail members and to the second rail members and can cause relative movement between the first and second rail members.

16. An apparatus as defined in claim 15, wherein the lifting means further comprises stabilizing means for being deployed and resisting horizontal movement of the horizontal runners relative to the ground and for being retracted and allowing horizontal movement of the horizontal runners.

17. An apparatus for moving a wheelchair, having two side frames with two wheels, from a first plane having a first elevation to a second plane having a second elevation, the apparatus comprising:
   a pair of parallel, horizontal runners;
   a support frame having a first upper clevis and a second upper clevis parallel to the first, each clevis having two projecting legs whose ends are connected by laterally extending members having ends that define attachment points;
   a first pair of elongated links pivotably attached at one end to one of the horizontal runners and attached at the other end to an attachment point associated with a clevis;
   a second pair of elongated links pivotably attached at one end to the other of the horizontal runners and attached at the other end to an attachment point associated with another clevis;
   a lower clevis having laterally projecting legs that extend outwardly and attach to the horizontal runners;
   a linear actuator attached at one end to the wheelchair and attached at the other end to the lower clevis;
   a sliding guide attached to each one of the wheelchair side frames that slidingly supports the wheelchair relative to the horizontal runners and allows the wheelchair to slide horizontally with respect to the horizontal runners; and
   propelling means for moving the wheelchair along the sliding guides.

* * * * *